United States Patent [19]
Good

[11] Patent Number: 4,672,794
[45] Date of Patent: Jun. 16, 1987

[54] APPARATUS AND METHOD FOR PACKING BULK MATERIAL IN PLASTIC BAGS

[76] Inventor: Maynard L. Good, 23257 County Rd., 18 E., Rte. 7, Elkhart, Ind. 46514

[21] Appl. No.: 760,336

[22] Filed: Jul. 29, 1985

[51] Int. Cl.[4] .......................... B65B 9/00; B65B 25/02
[52] U.S. Cl. ........................................ 53/440; 53/459; 53/249; 53/527; 53/567; 53/576; 100/189; 141/114; 414/24.5
[58] Field of Search ................. 53/255, 258, 260, 459, 53/469, 440, 513, 527, 567, 576, 570; 141/10, 114, 313, 390; 56/16.6, 343, 341; 414/24.5, 111, 132, 607, 608, 523; 100/65, 145, 189

[56] References Cited

U.S. PATENT DOCUMENTS

| 225,028 | 3/1880 | Straub . | |
|---|---|---|---|
| 487,355 | 12/1892 | Thompson . | |
| 723,072 | 3/1903 | Thom . | |
| 1,546,360 | 7/1925 | Bates . | |
| 2,114,104 | 4/1938 | Driscoll | 226/22 |
| 2,553,684 | 5/1951 | Soulen | 226/25 |
| 3,687,061 | 8/1972 | Eggenmuller et al. | 100/65 |
| 3,756,003 | 9/1973 | Divine | 56/344 |
| 4,054,018 | 10/1977 | Neukom | 53/124 |
| 4,337,805 | 7/1982 | Johnson et al. | 100/65 |
| 4,484,606 | 11/1984 | Kosters | 141/114 |
| 4,567,820 | 2/1986 | Munsell | 100/65 |

FOREIGN PATENT DOCUMENTS 67946 6/1944 Norway .

OTHER PUBLICATIONS

"New 'Silage Stuffer' Cuts Costs, Labor", Farm Show, vol. 6, No. 2, 1982, p. 32.
"'Half-Price' Silage Stuffer", Farm Show, vol. 7, No. 2, 1983, p. 21.
"'Silage Stuffers' Catching on Fast," Farm Show, vol. 7, No. 2, p. 21.
"Top Feed from Big Bags", reprinted from the mid--Mar. 1979 Farm Journal, Inc., Dairy Extra.
"Ag-Bagger It Works" Ag-Bag Corporation sales brochure.
"Ag-Bagger Designed for the 80's", Ag-Bag Corporation sales brochure.
"Silopress Your Future in Sealed Storage ... Today.", Silopress sales brochure.
"Finally, Fast Economical Unlimited Sealed Storage Roto-Press", Roto-Press sales brochure.
"The Kelly Ryan Big Bagger" sales brochure of Kelly Ryan.
"MAX-PAC The Affordable-Portable Sealed Storage Machine", Agri-Marketing/Development.

Primary Examiner—Robert L. Spruill
Assistant Examiner—Donald R. Studebaker
Attorney, Agent, or Firm—Arlyce R. Stearns

[57] ABSTRACT

Apparatus for packing bulk material including high moisture agricultural products such as grain in plastic bags has a transferring mechanism with a rotating device disposed in a generally upwardly directed plane relative to a support frame for positioning and locating the rotating device to create a rotating wedging action against bulk material within a plastic bag to provide an acceptable level of density both for ensiling of agricultural products and for storage of bulk materials.

31 Claims, 9 Drawing Figures

APPARATUS AND METHOD FOR PACKING BULK MATERIAL IN PLASTIC BAGS

BACKGROUND OF THE INVENTION

This invention relates generally to an apparatus and method for packing bulk material in plastic bags, and more particularly to an apparatus and method for packing both variable moisture and high moisture content bulk material such as grain, silage, and the like in plastic bags.

Traditionally, bulk material is fed into a chamber such as a silo structure for packing and storing. Another method of storing bulk material including both variable moisture and high moisture content bulk material comprises packing the bulk material in plastic bags. This not only packs the bulk material more efficiently, but it also reduces costly labor time as well as expensive storage space. The apparatus of the present invention for packing bulk material in plastic bags uses conventional agricultural equipment such as a common farm tractor which has a power take-off, and plastic tubing which has an adequate capacity for storing a predetermined quantity of packed bulk material such as high moisture grain, ensilage or other bulk particulate materials.

The use of impervious bags for storing bulk agricultural products is uncommon. In recent years, however, there has been an increasing trend in agriculture to store agricultural products such as corn, grains, ensilage, and the like, in impervious bags. Such bags replace costly building construction and maintenance and do not require the long term dedication of capital and valuable, productive farmland to a permanent storage structure. These bags of agricultural products are also more easily located in proximity to the area of use because they are not a permanent structure. As a result, it is feasible to change the feeding locations at will.

Horizontally disposed devices are available for packing bulk material which push the bulk material horizontally into bags. German Pat. No. 21 51 116 discloses a horizontally disposed apparatus which has a receiving member, a delivering member, and a horizontally disposed filling device connected to an open end of the delivering member for filling a plastic bag, and a movable platform to support the plastic bag.

While this system, or variations of it, have been used extensively for filling plastic tubing or plastic bags with bulk material, it does have serious drawbacks. One major one is the tendency of the delivering portion to become packed with the bulk material and thereby become plugged. Thus, the delivering end portions require constant attention and adjustment. Another drawback is the resistance of the plastic bag as it fills with the bulk material. As a result, to fill the bags efficiently with the bulk material, the plastic bags require constant attention during the filling operation. These systems presuppose a more or less horizontal arrangement of transferring and resultant problems of maintenance, particularly blocking and stalling. Finally, a great deal of costly energy as well as manual labor are required for its operation.

Bulk agricultural products are difficult both to transfer and to pack because of their variable moisture content, density and viscosity. Devices which have been available for receiving, transferring and packing such bulk material comprising an auger-like member for pushing the bulk material through a housing member disposed in a generally horizontal plane tend to cause the bulk material to pack in the housing member. This blocks efficient passage of the bulk material through the device, and prevents a smooth flow of the bulk material into the plastic tubing for packing. Thus, there is increased spacing between packed segments of the bulk material in the plastic tubing, and this also reduces the storage capacity of the plastic tubing.

Some devices for handling bulk agricultural products are mounted generally horizontally disposed on an elevated platform and and have a delivering portion which extends into the top of a storage container. The bulk material which is transferred through the delivering end of such horizontally disposed devices generally exits as an extruded material compacted by the force of the transferring mechanism. This extruded material is confined within the plastic bag.

Other continuous packaging systems are known which receive bulk material in one chamber, pack the bulk material into a compact mass, and force the compact mass into a tubular packaging material openly disposed over one end of the device for receiving the compact mass.

The use of bags for storage is suggested in U.S. Pat. No. 3,687,061 which discloses a device consisting of a forming mechanism which has two pairs of inclined worms rotatably driven in opposite directions to move the material through the forming channel into a mouth structure which supports a bag. As the material exits the mouth structure, it is pressed against a remote boundary wall anchored to a rope which is attached to a braking drum which regulates the pressing density of the material.

Consequently, a need exists for economical improvements for packing bulk material. Greater reliability and dependability of operation at reduced levels of labor and energy consumption are required for packing bulk materials such as grain, ensilage, and the like in plastic bags.

SUMMARY OF THE INVENTION

The present invention provides an improved "adjustable" packing apparatus and method designed to satisfy the aforementioned needs. Packing both variable moisture and high moisture content bulk material in plastic tubing is carried out by an "adjustable" system in the sense that the transferring and filling members are not horizontally disposed. Instead, an upwardly moving and rotating stream of the bulk material is created. Since the delivering end portion delivers the bulk material as a generally upwardly disposed rotating stream into the plastic bag, it eliminates the problem of blocking the delivering end with packed bulk material. Some agricultural products tend to overpack which causes self-feeding from the packed bags to become very difficult. This invention overcomes this problem by efficiently packing the bulk material in the plastic bag without overpacking the bag. While both systems require energy for transferring the bulk material into the plastic tubing, the adjustable system is substantially more energy efficient due to the smoothly flowing rotating stream of bulk material through the delivering means which increases the packing capacity by an order of magnitude. Also, the capital outlay required for the adjustable generally upwardly inclined packing system is much less than is required for a horizontally disposed system.

Accordingly, one form of the present invention relates to an improved apparatus and method for packing bulk material in plastic bags, which include the operative steps of: (a) transferring bulk material between a first position and a second position along a selected one of a plurality of inclined planes and into the plastic bags; (b) adjustably supporting the transferring member in the selected one of the plurality of inclined planes; and (c) guiding the transfer member into the plastic bags at a selected one of a plurality of substantially oblique angles for distributing the bulk material in the plastic tubing. The invention may also include the step of adjusting the exposure of an actuating member in accordance with the characteristics of the bulk material.

More specifically, in another form of the present invention, a large volume mass of bulk material including high moisture content bulk material is transferred along a generally upwardly inclined plane by rotating an actuating member. Also, the bulk material is pushed along the upwardly inclined plane by a broad helical flange member so as to push the material along as a rotating and smooth flowing stream to be delivered as a rotating mass into the plastic bag. The rotating movement of the actuating member exerts both a lateral force and a longitudinal force on the bulk material. As a result of these forces, the bulk material seeks its own level whereby it becomes evenly distributed in the plastic prior to compaction.

As the bulk material is packed in the plastic bag by the actuating member, a pressure builds which tends to force the entire tractor with the attached apparatus away from the packed portion of the plastic bag. The compaction density can be regulated by applying a braking action to oppose movement of the apparatus away from the packed portion of the plastic bag. The generally upwardly inclined broad helical flange produces an upwardly inclined force component directly longitudinally of the actuating member. At the same time, a horizontal force component is provided. A complete and even filling of the bulk material in the plastic bag is accomplished with the inclined upwardly directed force component. The horizontal force component allows the apparatus to move independently as the bulk material packs in the plastic bag.

This invention provides the smaller, independent farmer with sophisticated storage capabilities formerly reserved for capital intensive agricultural operations. Both the frame member and the cylinder member of this invention are used for the device for packing baled material in plastic bags as disclosed in U.S. patent application Ser. No. 633,138, as well as for the device of this invention for packing bulk material in plastic bags. The useful period of this equipment, therefore, extends from the first Spring harvest through the late Autumn harvest for variable crops, because the frame supports the packing devices interchangeably. As a result of these interchangeable features, for a minimum capital investment the small independent farmer will have the production capabilities usually acquired only with various pieces of dedicated equipment each requiring a greater capital outlay of from fivefold to tenfold.

It is an object of this invention to provide an improved apparatus and method for packing bulk material in plastic bags.

It is another object of this invention to provide an improved apparatus and method for packing high moisture content grain in plastic bags.

It is another object of this invention to provide an apparatus and method for causing both variable moisture and high moisture content bulk material to fill and pack in a plastic bag simultaneously.

It is yet another object of this invention to provide flexibility for on the site location to accommodate both baled crops and bulk material including high moisture grain.

It is yet another object of this invention to provide an apparatus and method for packing bulk material in plastic bags which requires less manual labor.

It is yet another object of this invention to provide an apparatus and method for packing bulk material in plastic bags which is easily adjustable to accommodate bulk material of varying density, viscosity and moisture content.

It is yet another object of this invention to provide an automatic apparatus for packing bulk material in plastic bags and which can be used with conventional farm equipment.

It is yet another object of this invention to provide an apparatus for packing bulk material in plastic bags which is economical to purchase, to maintain and to operate.

The above-mentioned and other features and objects of this invention, and the manner of attaining them will become more apparent, and the invention itself will be best understood by reference to the following description of embodiments of the invention taken in conjunction with the accompanying drawings.

DETAILED DESCRIPTION OF A PREFERRED EMBODIMENT

Referring now to the drawings, and more particularly to FIGS. 1-3, 7 and 8 there is shown the apparatus, generally designated 10, for packing bulk material, represented by broken lines 12, in plastic tubing tied at one end to form a bag 14. The apparatus 10 basically includes a device 16 for transferring bulk material 12 between an inlet portion 18 and a delivering portion 20, and member 22 for guiding the delivering portion 20 into the formed plastic bag 14. The generally upwardly inclined position of the delivering member 20 as it is received in the guiding member 22 projects the bulk material into the plastic bag 14 at a generally upwardly disposed angle to cause the bulk material 12 to pack as it fills the plastic bag 14.

Figure 2:
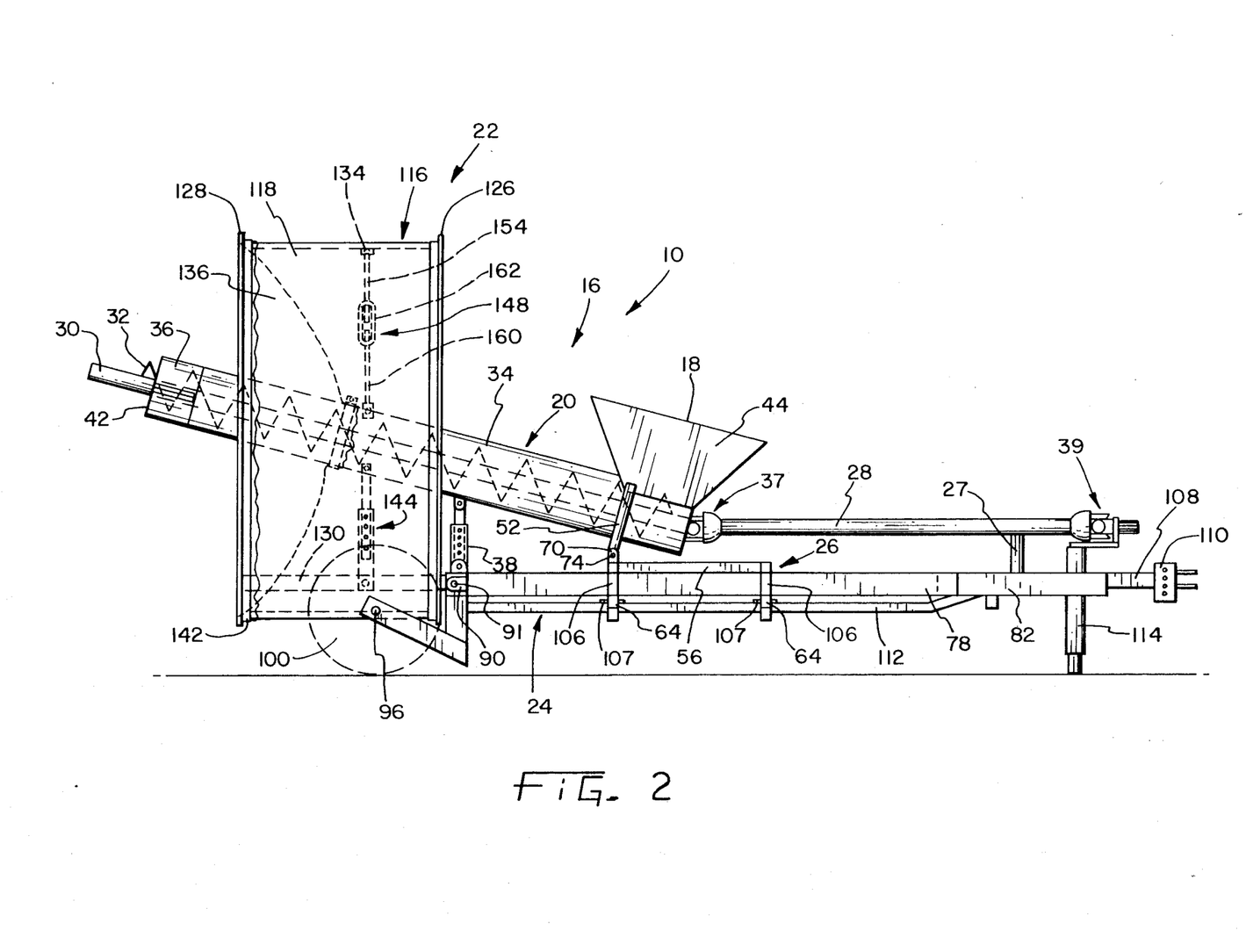
FIG. 2 is a side elevational view of the embodiment in the operating position.
Figure 3:
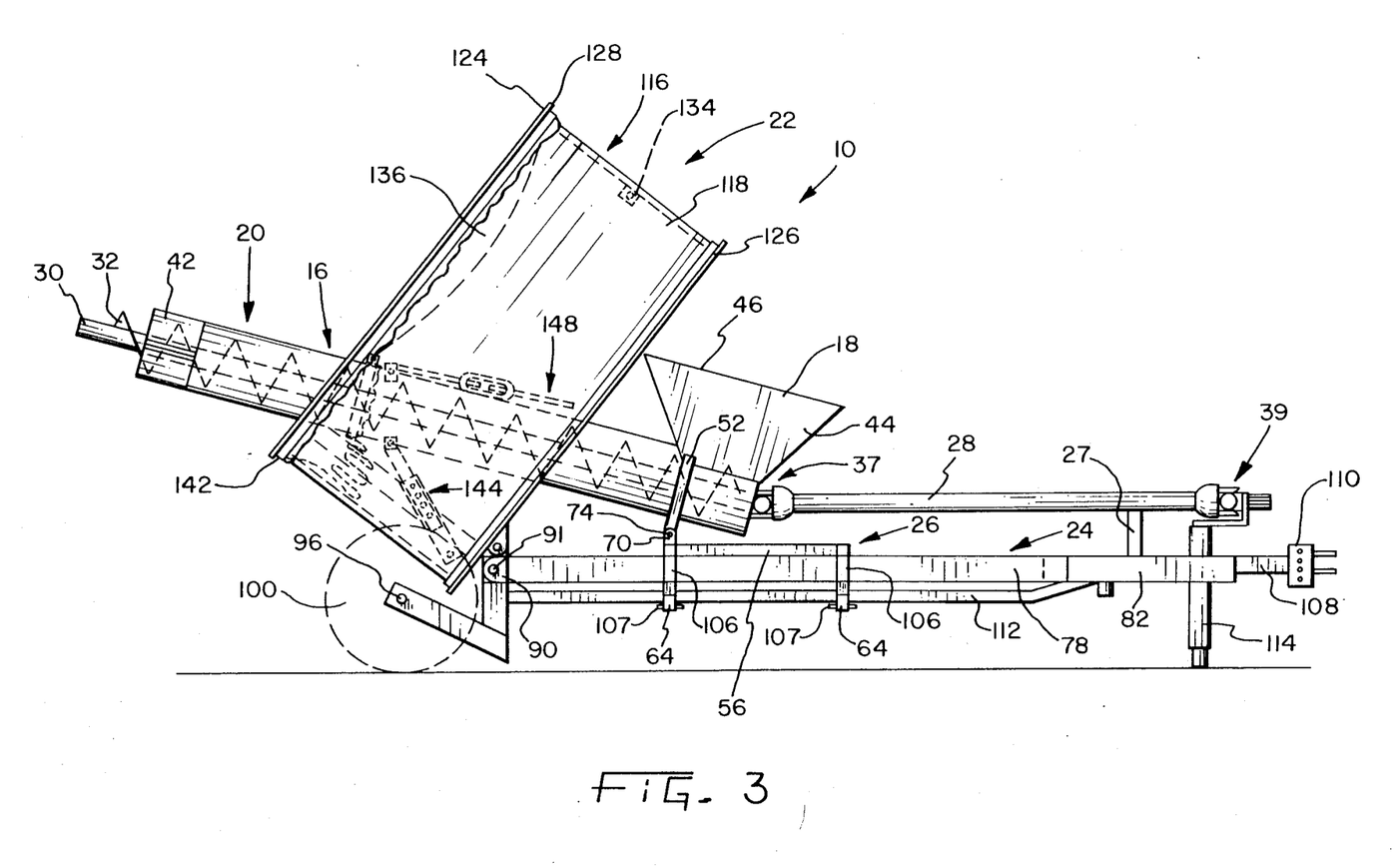
FIG. 3 is a side elevational view of the embodiment in the transport and plastic tubing mounting position.

Referring more particularly to FIGS. 2 and 3, transferring member 16 principally includes a frame 24, a removable mounting support member 26, a vertical support member 27, a drive member 28, an actuating member 30 with a broad helical flange 32, a cylindrical casing 34 for the broad helical flange, a bonnet portion 36 movably and removably connected to one end of the cylindrical casing 34, and an adjustable generally vertically disposed support assembly 38 attached to the frame 24 for supporting the delivering portion 20 in a selected one of a plurality of generally upwardly inclined planes. An adjustable upper portion 157 of support assembly 38 connects to a bracket member as hereinafter described.

Figure 7:
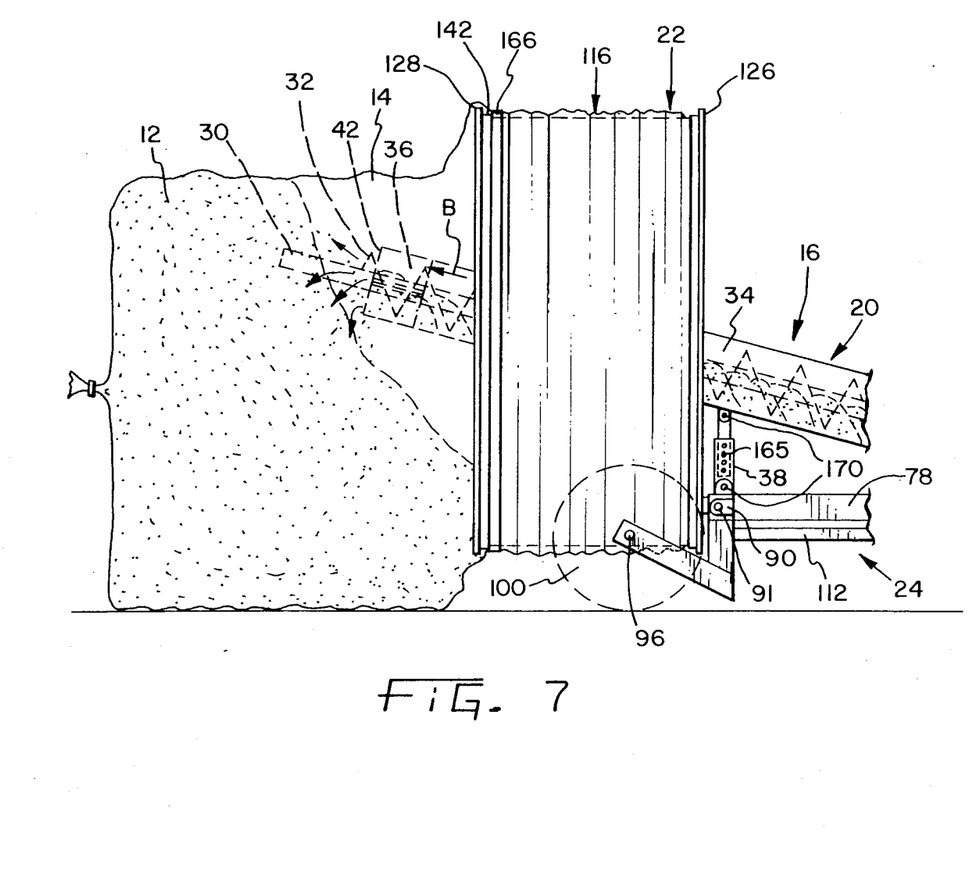
FIG. 7 is a partially fragmented side elevational view of the apparatus pushing bulk material into a plastic bag.
Figure 8:
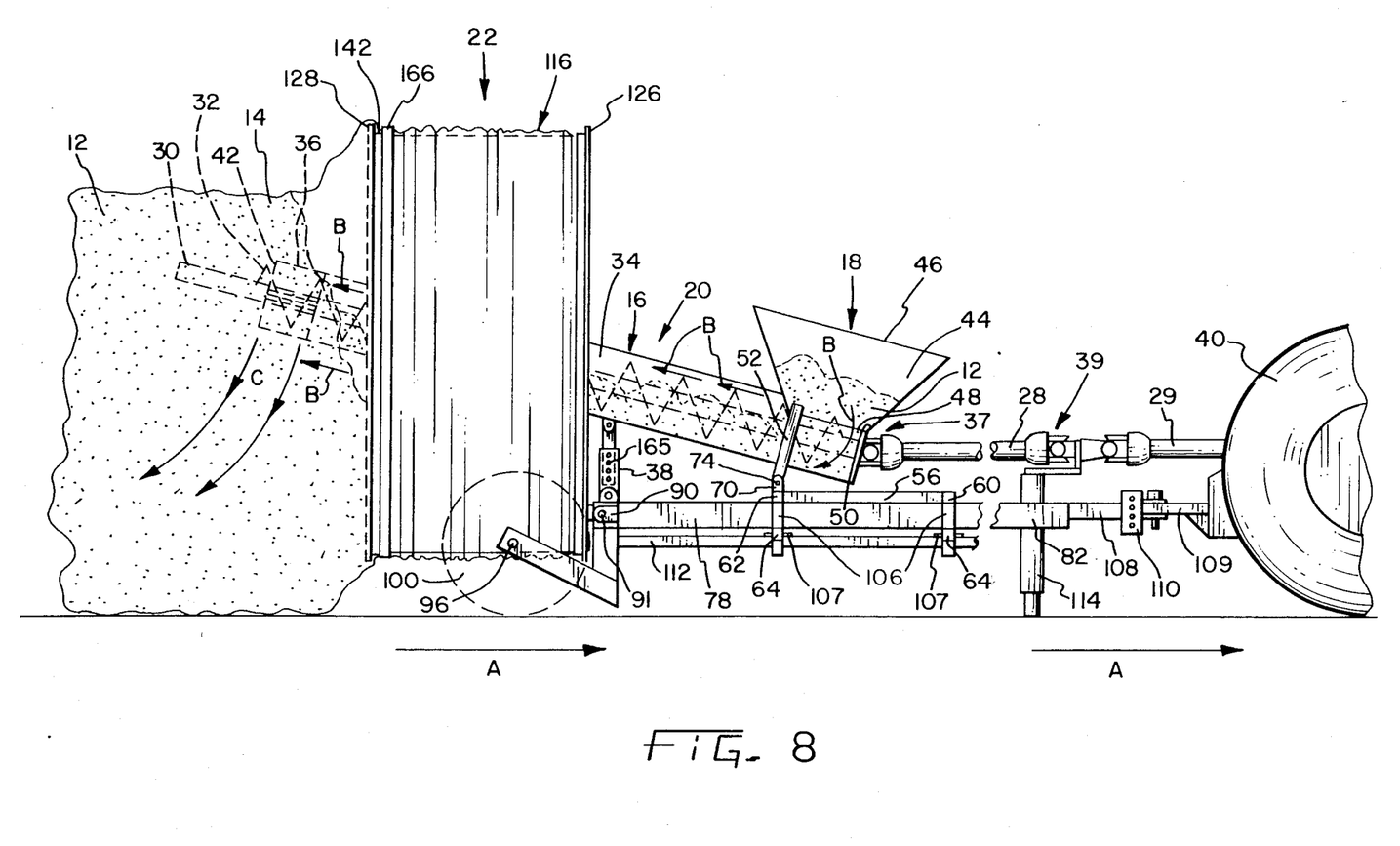
FIG. 8 is a partially fragmented side elevational view of the apparatus with the attached plastic bag substantially filled with the bulk material.

Referring now to FIGS. 7 and 8, the drive member 28 is attached to one end of the actuating member 30 by any conventional connecting means such as a journal 37, and is operatively connected by any conventional connecting means such as a journal 39 to a power source such as a power take-off (not shown) mounted on a towing vehicle 40 (FIG. 8) to transmit rotating motion to actuating member 30. The broad helical flange rotates concurrently with the actuating member 30. A distal end of both the actuating member 30 and the broad helical flange member 32 extend beyond an open end 42 of cylindrical casing 34.

Figure 9:
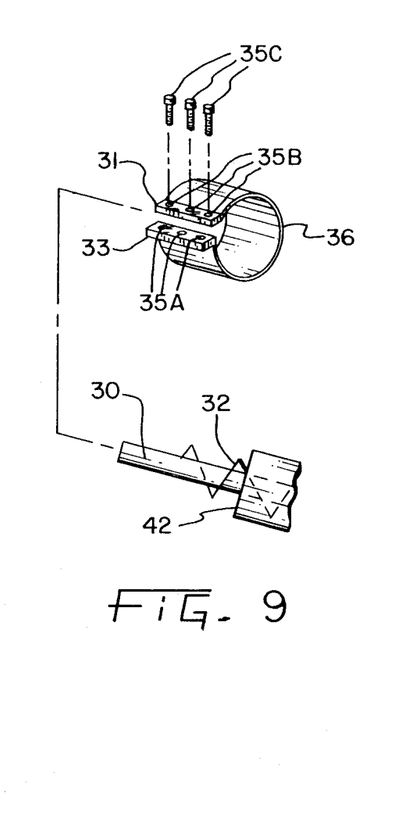
FIG. 9 is an exploded detailed view of the removable bonnet portion.

In FIG. 9, bonnet portion 36 is shown as removably connected to cylindrical casing 34 for adjusting the exposure of portions of the actuating member 30 and the broad helical flange member 32. The exposed portions of the broad helical flange member 32 must accommodate characteristics such as the density, viscosity and moisture content of the bulk material 12 being packed in the plastic bag 14.

Figure 5:
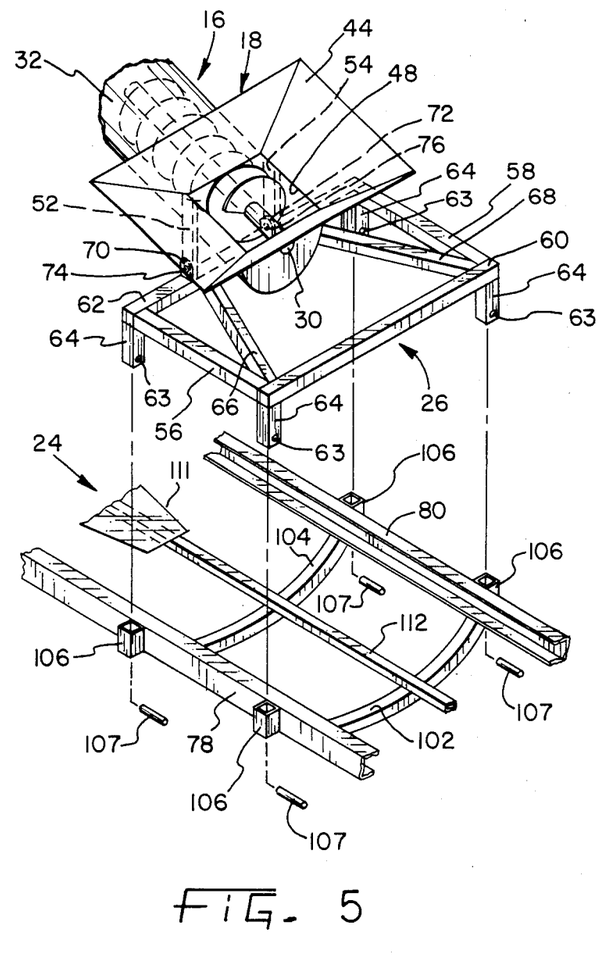
FIG. 5 is an exploded detailed view of the removable mounting assembly.

The inlet portion 18 includes a continuous wall member 44, and a top opening 46 communicating with a bottom opening 48. The inlet portion 18 is mounted over an opening 50 in cylindrical casing 34. The openings 46, 48, 42 and 50 communicate (see FIG. 8) for the transfer of bulk material 12 therethrough. Inlet portion 18 further includes a pair of leg members 52 and 54 (see FIG. 5) attached to wall member 44 in any suitable means such as welding.

The mounting support member 26 includes a frame-like perimeter formed by a pair of side rails 56 and 58 connected at each of opposite ends by a pair of cross rails 60 and 62, respectively. A substantially identical leg member 64 which has aligned openings 63 therethrough is secured at each intersection of the side rails 56, 58 with the cross rails 60, 62. A pair of thrust support members 66 and 68 extend medially from the interior intersections of cross rail 60 with side rails 56, 58, respectively, at a substantially oblique angle to connect to cross rail 62 intermediate a center point thereof and the intersections of cross rail 62 with side rails 56 and 58, respectively. The cross rail 62 includes a pair of bracket members 70 and 72, having openings therein (not shown), attached to an upper surface thereof aligned above the intersection with thrust support members 66, 68, respectively, for pivotally mounting leg members 52, 54 by placing pins 74 and 76, respectively, therethrough.

Figure 1:
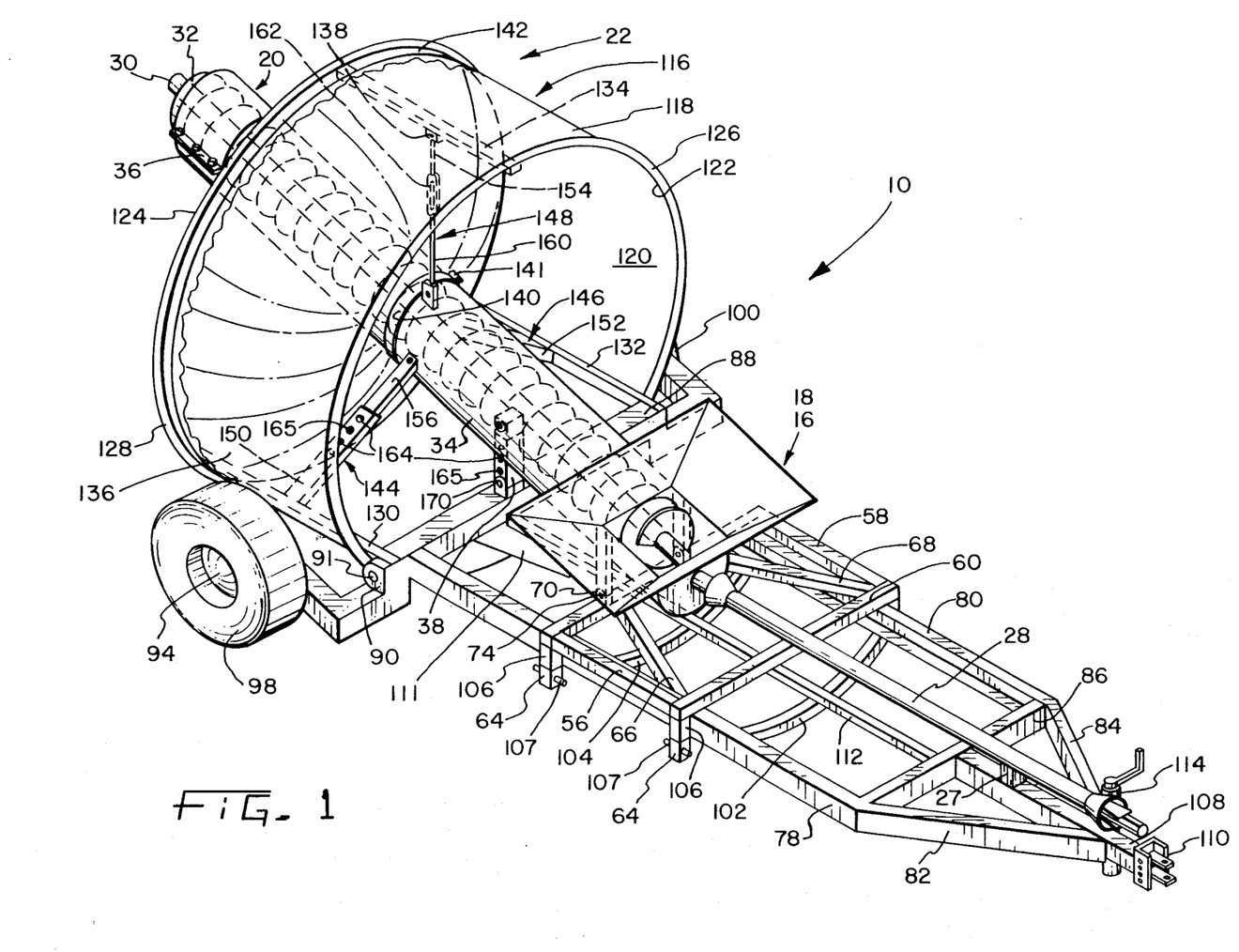
FIG. 1 is a perspective view of a preferred embodiment of the present invention.

Referring now more particularly to FIG. 1, the frame 24 includes a pair of substantially parallel side rails 78 and 80 continuously connected to a pair of centrally disposed side rails 82 and 84, a front cross member 86 connected at opposite ends to said rails 78, 80, and a rear cross member 88 connected to side rails 78, 80, and each extending downwardly then laterally outwardly from side rails 78, 80, respectively, and then rearwardly. A pair of bracket members 90, 92 (92 not shown) are attached by a removable pin 91 to a respective one of opposite downwardly extending portions of cross member 88. A pair of axle members 94 and 96 extend through rearward extensions on opposite sides of cross member 88 for rotatably mounting a pair of wheels 98 and 100, respectively. A pair of spaced-apart concave cross members 102 and 104 connect at opposite ends to the side rails 78, 80, intermediate cross members 86 and 88.

Frame 24 further includes an identical sleeve member 106 (identical reference numerals have been used where appropriate) which is secured by any appropriate means such as welding to an outer surface of side rails 78, 80 at the intersections with cross members 102, 104. Each of legs 64 extends through a corresponding one of sleeve members 106. Identical pins 107 are removably inserted through aligned openings 63 position below sleeve members 106 in legs 64 for removably mounting the transferring means 16 on frame 24.

Frame 24 further includes a tongue member 108 attached at one end to the central portion of a forward surface of cross rail 86 and extends forwardly and is attached to forward rails 82, 84. Tongue member 108 extends beyond the intersection with rails 82, 84 to provide a point for hitching the frame 24 to a drawbar 109 of the towing vehicle 40 (partially indicated in (FIG. 8). A hitching device 110 connects the tongue 108 to drawbar 109.

The frame 24 further includes a gusset member 111, and a center rail 112 connected at opposite ends to cross members 86, 88 and attached to gusset member 111. A support such as a commercially available screw-type jack stand 114 can be positioned under either of lateral rails 82, 84.

The guiding member 22 (FIGS. 1 and 4) includes a cylindrical device 116 with an exterior surface 118, an interior surface 120, opposite open ends 122 and 124, a pair of annular flanges 126 and 128, and spaced-apart rib-like members 130, 132, 134. The guiding means 22 further includes a wall member 136 of a suitable flexible material such as tarpaulin cloth, canvas, plastic, fiberglass or a plastic impregnated fabric. The wall member 136 has an opening therethrough defined with a removable collar member 140, preferably a steel angle iron, and having a commercially available closure 141 such as an over-centering hasp. Wall member 136 further includes an annular member 142 attached to an outer border thereof for mounting over open end 124 so that wall member 136 is disposed within cylindrical member 116 intermediate opposite open ends 122, 124. Wall member 136 provides a barrier element intermediate opposite open ends 122, 124. The collar 140 preferably has an adequate diameter for securely and removably receiving the delivering member 20 therethrough.

Figure 4:
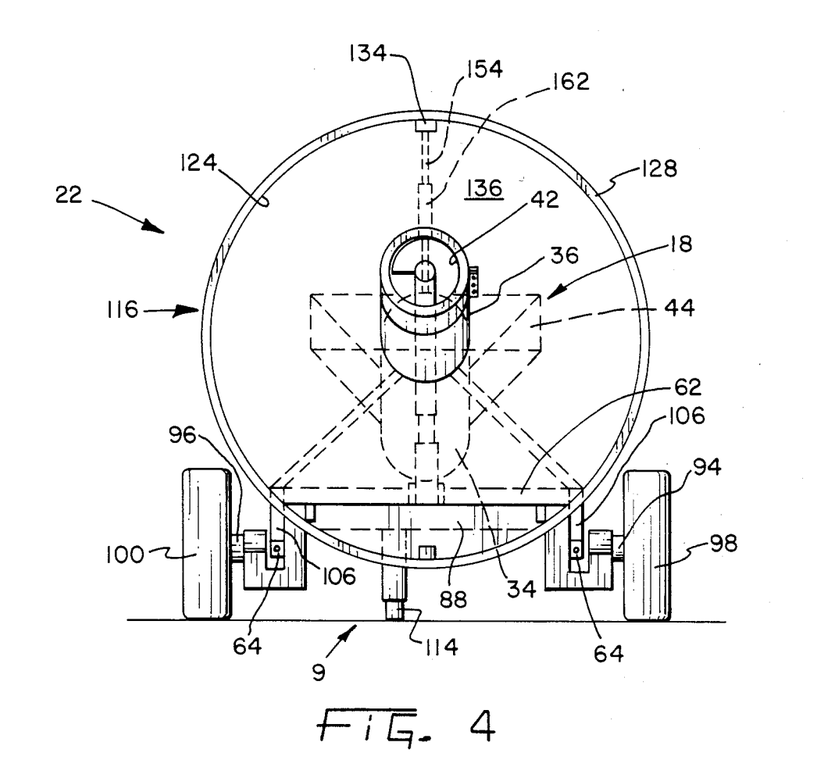
FIG. 4 is a back elevational view.
Figure 6:
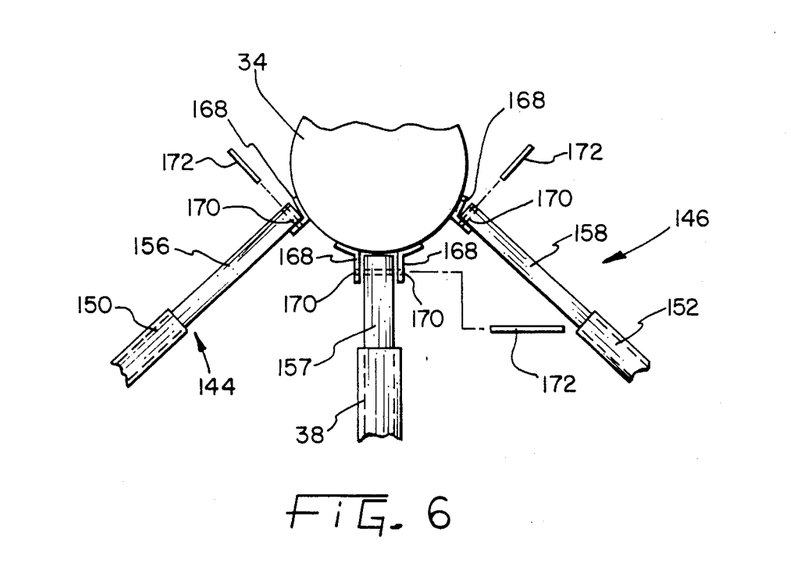
FIG. 6 is a fragmentary detailed view of support members attached to the transferring member.

Referring now to FIGS. 1, 4 and 6, the guiding member 22 further includes spaced-apart support assemblies 144, 146, 148 each having one end of portions 150, 152, and 154, respectively attached to the rib members 130, 132, 134, respectively. Portion 154 is attached to rib member 134 by means of a yoke 138, while portions 150, 152 are frictionally held against rib members 132, 134, respectively, by a pressure exerted through support assembly 148 as hereinafter described. Support assemblies 144, 146, 148 have a second portion 156, 158, 160, respectively, at one end thereof connected to a bracket member 168 (see FIG. 6). One portion of each of bracket members 168 is attached to cylinder casing 34 by any suitable attaching means such as welding. One end of portions 156, 157, 158, and a second portion of each of bracket members 168 have aligned openings 170 therethrough which removably receive a pin 172 to adjustably support cylindrical casing 34 along the selected inclined plane. An opposite end of each of portions 156, 157, 158 is adjustably connected to portions 150, 38, 152, respectively by a series of aligned openings (FIG. 1) 164 to removably receive bolt 165 therethrough.

Adjustable support assembly 38 provides a plurality of positions for supporting delivering member 20 in a generally upwardly inclined plane between inlet portion 18 and opening 42. Support assembly 148 is adjusted by a turnbuckle 162 to exert pressure against support assemblies 144, 146 to cooperatively support delivering member 20 along the selected inclined plane.

Adjustable support elements 144, 146, 148, maintain delivering member 20 in the selected upwardly inclined plane to be received by wall member 136. Collar 140 substantially seals around the cylindrical casing 34 whereby wall member 136 provides a substantially complete barrier to prevent bulk material 12 from escaping from the plastic bag 14 through the opening 124.

The open end 124 is pivotally mounted on frame 24 by brackets 90, 92 attached to rear cross member 88. In this manner, guiding means 22 is removably mounted on frame 24 and can be tilted forwardly as shown in FIG. 3 for placing plastic tubing over open end 124 and for transporting apparatus 10. Alternatively, guiding member 22 can be disposed so that open ends 122, 124 are axially aligned with frame 24 as shown in FIG. 2 for packing bulk material 12 in plastic bags 14. Open end 124 is received in one open end of plastic tubing and the entire length of plastic tubing is placed over cylindrical device 116, and tied over open end 124 to form plastic bag 14. A retaining member 166, preferably a flexible black plastic pipe, is then placed over the plastic bag 14 on exterior surface 118 to control the flow of plastic bag 14 therefrom as plastic bag 14 is packed with bulk material 12.

As transferring member 16 transfers bulk material 12 through cylindrical casing 34 (indicated by arrows "B" in FIGS. 7 and 8), support members, 144, 146 148 maintain delivering member 20 in the selected generally upwardly inclined plane. Delivering member 20 is received at a substantially oblique angle through the wall member opening defined by collar member 140 for rotatably delivering bulk material 12 as a circulating mass (indicated by arrows "C", FIG. 7), to be distributed in plastic bag 14.

As plastic bag 14 continues to be filled with circulating bulk material 12, the end of actuating member 30 becomes buried by bulk material 12 packed in plastic bag 14. The rotation of actuating member 30 produces a wedging effect within the transferred bulk material 12. This rotating wedging effect provides both lateral and longitudinal packing action.

The apparatus 10 moves (as indicated by arrows generally designated "A" in FIG. 8) in response to the resistance of bulk material 12 packed in the plastic bags 14 and thereby both avoids blocking the delivering device 20 and facilitates packing the plastic bag 14 to its capacity with the bulk material 12. Apparatus 10, therefore, provides a more economical method for storing bulk material 12 in that it operates to transfer the bulk material 12 smoothly and thereby requires less fuel, and it packs the plastic bags 14 more efficiently.

While this invention has been described as having "a" preferred embodiment, it will be understood that it is capable of further modifications. This application is, therefore, intended to cover any variations, uses, or adaptations of the invention following the general principles thereof, and including such departures from the present disclosure as come within known or customary practice in the art to which this invention pertains and fall within the limits of the appended claims.

I claim:

1. An improved apparatus for packing bulk material in plastic bags, comprising:

a frame having a substantially horizontally disposed rail assembly;

means supported on said frame for transferring bulk material between a selected one of a first position and a second position and into a plastic bag as an adjustably directed stream;

means mounted on said frame adjacent one end of said transferring means for maintaining one end of said plastic bag open to receive a delivering member of said transferring means and said stream of bulk material;

means for creating a rotating wedging action against said transferred bulk material within said plastic bag;

means for adjusting said rotating wedging action means within the plastic bag to accommodate the characteristics of the bulk material and to effect a desired density of packed bulk material; and means substantially resiliently responsive to pressures exerted by the characteristic densities of the transferred bulk material for urging said transferred material into the plastic bag.

2. The apparatus of claim 1, further comprising:

means mounted on said frame for adjustably supporting one of said first position and said second position of said transferring means in a selected one of a plurality of substantially vertically disposed certain positions relative to the other of said first position and said second position;

means releasably connected to said transferring means for pivotally mounting said transferring means on said frame whereby one of said first position and said second position is supported by said supporting means in said selected one of said plurality of certain vertically disposed positions relative to the other of said first position and said second position; and means secured to said maintaining means for adjustably guiding a delivering member of said transferring means being supported by said supporting means in said selected one of said plurality of certain vertically disposed positions whereby said bulk material is selectively delivered into the plastic bag as a generally upwardly directed stream.

3. The apparatus of claim 2, wherein said means for creating a rotating wedging action against said transferred bulk material in the plastic bag includes:

means for rotating said bulk material in said transferring means;

means for exerting both a lateral force and a longitudinal force on the bulk material within the plastic bag; and a bonnet member releasably connected to said delivering member for exposing a determined length of said rotating means within said plastic bag in accordance with the density of the bulk material.

4. The apparatus of claim 1, wherein said transferring means includes:
means for removably mounting said transferring means on said frame;
a housing member including:
means for releasably and pivotally mounting said housing member on said removable mounting means,
means for receiving the bulk material, and
means communicating with said receiving means for delivering the bulk material in the plastic bag.

5. The apparatus of claim 4, wherein said delivering means includes:
means rotatably mounted within said housing and extending beyond said delivering means for actuating said transferring means; and
a drive member attached to said actuating means for use with a power source to transmit a rotating motion to said actuating means.

6. The apparatus of claim 5, wherein said means for creating a rotating wedging action includes:
a helical flange member mounted along the longitudinal axis of said actuating means;
means mounted on said frame for adjustably positioning one of a first end portion and a second end portion of said delivering means in said selected one of said plurality of substantially vertically disposed certain positions relative to the other of said first end portion and second end portion;
means for pivotally supporting said delivering means on said removable mounting means;
means connected to said delivering means for selectively exposing a determined length of said helical flange member within said plastic bag; and
means attached to said maintaining means for adjustably guiding said one end portion of said delivering means into the plastic bag through said maintaining means at said selected one of said plurality of vertically disposed certain positions relative to said other end portion whereby the bulk material is transferred along a selected one of a plurality of certain inclined planes to be delivered within the plastic bag as a generally obliquely directed rotating stream of bulk material.

7. The apparatus of claim 6, wherein said means for adjusting said rotating wedging action means within the plastic bag comprises:
a bonnet member movably mounted on said housing and adapted to adjust the length of said helical flange member exposed beyond said housing within said plastic bag.

8. The apparatus of claim 7, wherein said maintaining means includes:
a cylindrical member having exterior and interior surfaces, spaced-apart communicating open ends, and at least one annular flange;
means removably mounted on said cylindrical member for releasably retaining said plastic bag in position for receiving said bulk material from said delivering means; and
means attached to said cylindrical member for pivotally and removably mounting said cylindrical member on said frame.

9. The apparatus of claim 8, wherein said adjustable support means includes:
said adjustable positioning means mounted on said frame for providing a plurality of certain vertical positions;
a cooperating set of spaced-apart adjustable brace assemblies removably mounted on said interior surface of said cylindrical member, each of said brace assemblies being selectively extendible to connect to said delivering means; and
an adjusting member attached to one member of said set of brace assemblies to exert pressure on said set of brace assemblies to maintain said delivering means in position along the selected one of said plurality of certain inclined planes.

10. The apparatus of claim 9, wherein said urging means comprises:
at least one substantially impervious wall member with an opening therethrough for receiving said delivering means at a selected one of a plurality of certain substantially oblique angles;
a collar member defining said wall member opening; and
means attached to a border portion of said wall member for removably mounting said wall member over one of said opposite open ends of said cylindrical member.

11. The apparatus of claim 10, wherein said wall member is resiliently responsive to the characteristic pressure exerted by the transferred bulk material for urging said stream of bulk material from said delivering means into said open end of the plastic bag retained over one of said open ends of said cylindrical member and facing said wall member.

12. The apparatus of claim 10, wherein said wall member comprises a substantially resilient and impervious barrier intermediate said opposite open ends of said cylindrical member to urge said delivered bulk material into the plastic bag and to adjustably receive said delivering means at the selected one of said plurality of certain substantially oblique angles.

13. The apparatus of claim 6, wherein said frame further includes:
a plurality of spaced-apart substantially elongate rail members connected by a plurality of cross members;
means attached to said frame for releasably receiving said means for removably mounting said transferring means;
at least one axle attached to said frame;
at least one wheel rotatably supported on said axle; and
means attached to at least one end of said frame for hitching said frame to a vehicle adapted for towing.

14. The apparatus of claim 13, wherein said frame removably supports said cylindrical member adjacent said transferring means whereby said delivering means is directed generally upwardly between said first position and said second position along said selected one of said plurality of certain inclined planes and into the plastic bag.

15. The apparatus of claim 10, wherein said collar member receives said delivering means therethrough at the selected one of said plurality of oblique angles.

16. The apparatus of claim 10, wherein said collar member tightly circumferentially receives and maintains said positioned delivering means within said bulk material within said plastic bag.

17. The apparatus of claim 16, wherein said bonnet member selectively locates said delivering means within said bulk material within the plastic bag.

18. The apparatus of claim 10, wherein said selected length of said rotating helical flange member selectively exposed beyond said delivering end portion of said housing provides a rotating action against said bulk material within said plastic bag, thereby providing both lateral and longitudinal packing against said bulk material.

19. The apparatus of claim 10, wherein said wall member provides a restrictive boundary for urging said transferred bulk material into the plastic bag.

20. An improved apparatus for packing bulk material into plastic bags, comprising:
   a transportable frame having a substantially horizontally disposed rail assembly;
   means pivotally connected to said frame for selectively transferring bulk material as an adjustable generally obliquely directed rotating stream between a first position and a second position and into plastic tubing formed into a bag;
   means removably mounted on said frame for positioning said plastic bag to receive said bulk material from said transferring means;
   means mounted on said frame for positioning one of opposite end portions of a delivering member of said transferring means in one of a first position and a second position, one of said first position and said second position being selectively disposed in one of a plurality of certain generally vertical positions relative to said other of said first position and said second position, whereby said delivering member is selectively disposed in a selected one of a plurality of certain inclined planes;
   an actuating member having opposite ends, rotatably mounted in said transferring means and connected to a drive means for delivering said bulk material within said plastic bag as a selectively directed rotating stream whereby said transferring means creates an adjustable generally upwardly directed rotating wedging action against said transferred bulk material within the plastic bag, whereby the characteristics of the bulk material being packed are accommodated so that the desired density of packed material is effected; and
   means for maintaining said delivering member of said transferring means at a selected one of a plurality of substantially oblique angles within said plastic bag and for resiliently urging said transferred bulk material into the bag as it is delivered into the plastic bag as a generally upwardly directed rotating stream of bulk material.

21. An improved apparatus for pushing bulk material into plastic bags, comprising:
   a frame having a substantially horizontally disposed rail assembly for use with a towing vehicle;
   an adjustable transferring member removably supported on said frame and having an inlet means and a delivering means;
   a bonnet member removably and extendibly connected to said delivering means;
   an actuating member rotatably mounted in said transferring means;
   a drive member attached to said actuating member for use with a power source for transmitting a rotating motion to said actuating member, said drive member being adapted to respond to a resistance from a certain quantity of said bulk material packed in the plastic bag by causing said frame member to be moved;
   a broad helical flange member mounted on said actuating member and adapted for rotating concurrently therewith thereby causing said bulk material to be pushed through said delivering means as a constant rotating stream;
   a cylindrical member pivotally and removably mounted on said frame and having an interior surface defining a certain interior diameter and opposite open ends each having an annular flange;
   means mounted over said cylindrical member intermediate said annular flanges for releasably securing one end of the plastic bag over one of said opposite open ends; and
   at least one substantially resilient impervious wall member having responsively adjustable opposite convex and concave surfaces with an opening therethrough, said wall member being removably mounted over one of said opposite open ends for receiving said delivering means therethrough at a selected one of a plurality of substantially oblique angles whereby said bulk material enters into the plastic bag as a generally upwardly material into the plastic.

22. An improved apparatus for packing bulk material into plastic bags, comprising:
   a support frame adapted to be connected to a towing vehicle;
   a transferring member pivotally supported on said frame and having a delivering portion selectively disposed between a first position and a second position, one of said first position and said second position being adjustable generally vertically to one of a plurality of certain positions relative to said other of said first position and said second position, whereby said delivering portion is disposed along a selected one of a plurality of certain inclined planes relative to said frame;
   an auger member rotatably mounted in said transferring member for rotatably moving the bulk material therethrough;
   a drive member operatively connected to said auger member for actuating said transferring member to deliver a rotating stream of bulk material;
   means removably mounted on said frame for positioning the plastic bag to receive a generally upwardly directed rotating stream of bulk material from said transferring member;
   a bonnet member movably connected to said transferring member for adjusting the length of auger exposed within the plastic bag; and
   means for exerting a lateral force and a longitudinal force simultaneously to create a rotating wedging action against said bulk material within said plastic bag.

23. The apparatus of claim 22, wherein said means for creating said rotating wedging action includes:
   means for positioning said transferring member in a selected one of said plurality of inclined planes in accordance with the characteristics of said bulk material; and
   means for selectively exposing a selected length of flighting on said auger member within the plastic bag to cooperate with said inclined plane of said transferring means to accommodate the characteristics of said bulk material.

24. An improved apparatus for packing bulk material in plastic bags, comprising:
   a frame having a substantially horizontally disposed rail assembly;

means supported on said frame for transferring bulk material between a first position and a second position and into a plastic bag as an adjustably directed stream;

means creating a rotating wedging action against said transferred bulk material in said plastic bag, including:

means for rotating said bulk material in said transferring means, and means for exerting both a lateral force and a longitudinal force simultaneously on said bulk material within said plastic bag;

means for adjusting said rotating wedging action means within said plastic bag to accommodate the characteristics of said bulk material and to effect a desired density of packed bulk material, said adjusting means including:

a bonnet member releasably connected to said delivering member for exposing a determined length of said rotating means within said plastic bag in accordance with the density of said bulk material, and means mounted on said frame for adjustably positioning one of said first position and said second position of said transferring means in a selected one of a plurality of substantially vertically disposed certain positions relative to the other of said first position and said second position;

means substantially resiliently responsive to pressures exerted by the characteristic densities of said transferred bulk material for urging said transferred bulk material into said plastic bag; and means removably mounted on said frame for adjustably guiding a delivering member of said transferring means into said plastic bag.

25. An improved apparatus for packing bulk material in plastic bags, comprising:

a frame having a substantially horizontally disposed rail assembly;

means supported on said frame for transferring bulk material between a first position and a second position and into a plastic bag as an adjustably directed stream, said transferring means including:

means for removably mounting said transferring means on said frame, a housing, means for releasably and pivotally mounting said housing on said removable mounting means, means for receiving said bulk material, and means communicating with said receiving means for delivering said bulk material into said plastic bag;

means for creating a rotating wedging action against said transferred bulk material in said plastic bag, said means including:

means rotatably mounted within said housing and extending beyond said delivering means for actuating said transferring means, a helical flange member mounted along the longitudinal axis of said actuating means, a drive member attached to said actuating means for use with a power source to transmit a rotating motion to said actuating means, and means for guiding one end portion of said delivering means into said plastic bag at a vertically disposed position relative to another end portion of said delivering means whereby said bulk material is delivered within said plastic bag as a generally obliquely directed rotating stream of bulk material;

means for adjusting said rotating wedging action means within said plastic bag to accommodate packing characteristics of said bulk material and to effect a desired density of packed bulk material said adjusting means including:

a bonnet member movably mounted on said housing and adapted to adjustably expose a determined length of said helical flange member beyond said housing and within said plastic bag; and means substantially resiliently responsive to pressures exerted by said characteristics of said transferred bulk material for urging said transferred material into said plastic bag.

26. A method for packing bulk material in plastic bags comprising the steps of:

selecting one of a plurality of certain positions on a substantially vertically disposed adjustable support member mounted on a generally horizontal base frame;

positioning a transferring apparatus on said base frame and said support member so that said transferring apparatus lies along a selected one of said plurality of certain inclined planes; and placing plastic tubing over one end of a cylindrical member mounted on said base frame adjacent said transferring apparatus; then transferring the bulk material between a first position and a second position along said selected one of said plurality of inclined planes into the plastic bag; and creating a rotating wedging action against the bulk material within the plastic bag.

27. The method for packing bulk material in plastic bags recited in claim 26, wherein transferring bulk material between a first position and a second position along a selected one of said plurality of inclined planes includes:

placing a delivering end portion of the transferring apparatus through a guiding member at a selected one of a plurality of certain substantially oblique angles; and actuating said transferring apparatus.

28. The method for packing bulk material in plastic bags as recited in claim 27, wherein positioning the delivering end portion at a selected one of said plurality of substantially angles within the plastic bag includes:

adjusting a first support member to a selected one of a plurality of vertical positions against a first portion of the transferring device;

then adjusting a set of spaced-apart cooperating brace assemblies against a second portion of the transferring device; and then placing a distal end of the transferring apparatus through a wall member opening of said guiding member.

29. The method for packing bulk material in plastic bags as recited in claim 28, further comprising the steps of:

releasably securing one end of plastic tubing over an open end of said guiding member, and closing off the opposite end of said plastic tubing to form a bag; and delivering the bulk material through the transferring device as a generally upwardly directed rotating stream whereby the bulk material is dispersed in the plastic bag as a circulating mass; and then adjusting a bonnet portion on said transferring apparatus to adjust said transferring apparatus to accommodate the characteristics of the bulk material.

30. A method for packing bulk material in plastic bags comprising the steps of:

mounting a transferring apparatus on a transportable support frame;

adjusting one of opposite end portions of said transferring apparatus to one of a plurality of certain vertical positions relative to the opposite end portion of said transferring apparatus whereby said transferring apparatus is adjustable to a plurality of certain inclined planes;

transferring bulk material between a first position and a second position along a selected one of a said plurality of certain inclined planes into the plastic bag;

preparing plastic tubing to receive the bulk material as it is delivered from said transferring apparatus;

guiding the transferring apparatus into the plastic bag at a selected one of a plurality of certain substantially oblique angles for packing the plastic bag with the bulk material; and creating a rotating wedging action against the transferred bulk material within the plastic bag.

31. A method for packing bulk material in plastic bags comprising the steps of:

positioning a transferring device on a support frame for use with a towing vehicle;

mounting a guiding device on said support frame adjacent said transferring device;

securing one end of plastic tubing over one end of said guiding device and tying an opposite end of said plastic tubing to form a bag;

enclosing a delivering end portion of said transferring device intermediate a wall member within said guiding device and the tied end of the plastic tubing;

transmitting rotating motion to an actuating device rotatably mounted in said transferring device; and introducing bulk material into an inlet portion of said transferring device; and then locating and exposing a certain length of said actuating device within said bulk material within said plastic bag to provide an acceptable level of density both for ensilage of agricultural products and for storage of bulk material.

* * * * *